Sept. 12, 1967        D. M. HOFFMAN        3,341,186
MATERIALS HEATING AND HANDLING APPARATUS
Filed April 28, 1965        3 Sheets-Sheet 3
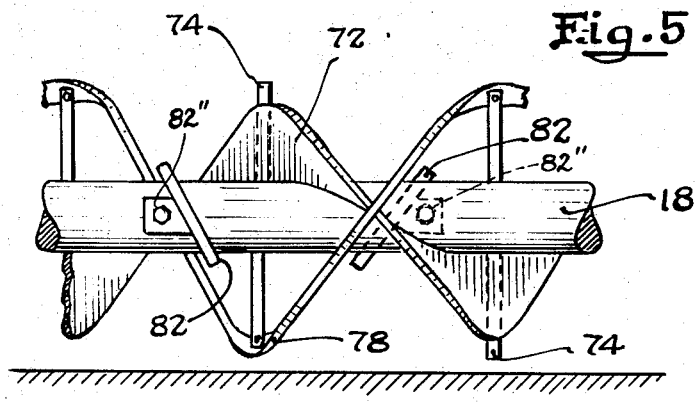
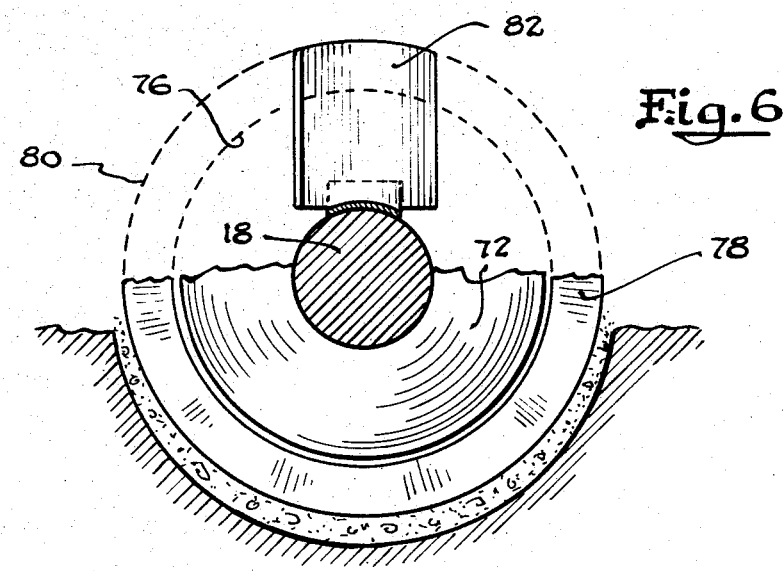
Inventor
Donald M. Hoffman
By Frost, Burmeister & Kulie
Attorneys United States Patent Office 3,341,186
Patented Sept. 12, 1967

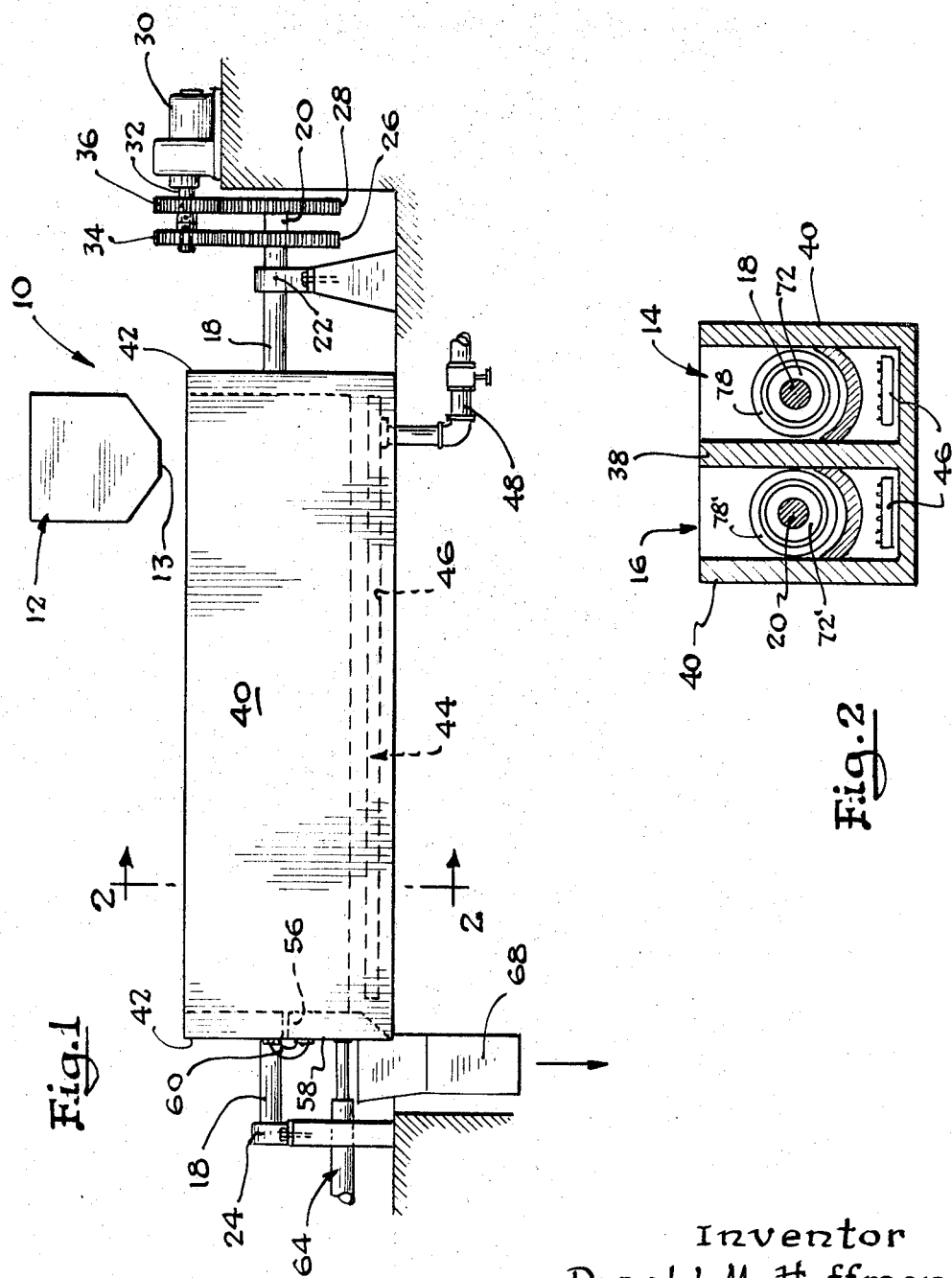

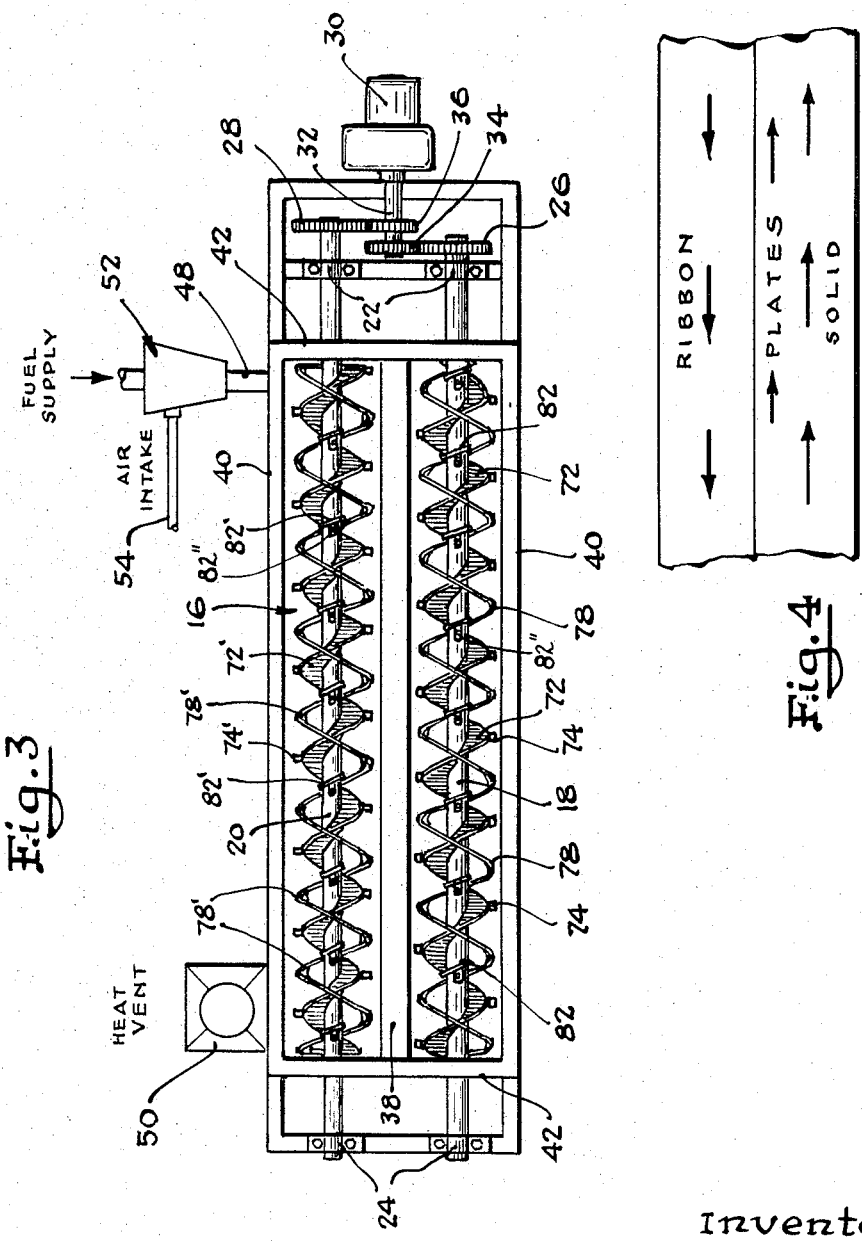

3,341,186
MATERIALS HEATING AND HANDLING
APPARATUS
Donald M. Hoffman, Chicago, Ill., assignor to General
Refractories Company, Philadelphia, Pa.
Filed Apr. 28, 1965, Ser. No. 451,599
8 Claims. (Cl. 263—25)

ABSTRACT OF THE DISCLOSURE

Apparatus for uniformly conditioning particulate materials including a heated trough adapted for receiving material, a rotating shaft within the trough having an inner helical blade adapted to move the material in one direction, an outer helical blade on the shaft adapted to move the material in the opposite direction, and a plurality of adjustable plate elements extending radially from the shaft between the inner and outer blades, the plate elements extending into the region swept by the outer helical blade and defining helical segments along the shaft, the adjustable plate elements cooperating with the helical blades to provide a balanced movement of materials within the trough.

---

The present invention relates to an apparatus for heating and handling materials and more particularly it relates to an improved heating and handling apparatus for bulk materials in particulate form to assure uniform conditioning of the materials and to provide for handling and discharge thereof.

One use for the apparatus disclosed herein is for a heater in the handling of refractory materials used in the manufacture of refractory brick. Historically one of the methods of heating and handling during processing of materials for the manufacture of refractory brick has been a continuous operation whereby refractory material passes continuously through a screw-type heater-conveyor, for example, is heated, held and then discharged into a hopper or bin until the brick making apparatus involved in the molding operation is ready to accept the material for pressing or molding into brick form. The material, thus, is kept heated in the hopper and discharged from the hopper to the brick molding presses as required. While it is in the hopper the material is dormant and subject to varying thermal exchange rates.

The service behavior of refractories is dependent, in part, upon processing conditions during manufacture of the refractory brick. If the refractory material is too hot when molded it is likely to spall or crack in service. Other processing ramifications, including those involved in the heating and holding stage of the processing sequence, may have equally disastrous consequences upon the finished product. It should be observed that the materials should be pressed into brick form at a preferred temperature level for optimum processing. This temperature level will vary and is a characteristic of the materials used in making brick. If the material is molded while at a temperature significantly above the preferred level volatiles may be driven off after release of the molding pressure. This action (release of volatiles) will create stresses in the brick which will crack the brick in a manner similar to thermal cracking of such brick. Stress risers caused by the cracks render the brick useless for a refractory wall, or the like. Thus, it is important to have a controlled process at all stages of the brick manufacturing operation, if this is possible.

The fabrication of a refractory body generally includes processing of granular or particulate materials, by various steps, to form the materials into a definable structure such as a brick, furnace bottom, or the like, having some mechanical strength. The structure of the refractory body may include solid grains in a matrix or ground mass with a suitable bonding agent to hold the materials in a coherent form.

The finished refractory structure generally is porous in that the matrix is not likely to fill all of the intergranular areas of the form. The structure also is subject to variations in relative amounts of granular materials sizes in the form of size distribution and thus in porosity of the bricks or other refractory forms.

It has been observed that a refractory generally will fail by deterioration or failure of the bonding materials employed to hold the granular materials in the predetermined shape. By controlling the size distribution of the particulate or granular materials to minimize the presence of voids the amount of bonding material required may be minimized, in part, by mechanical interlocking of the particles or by sintering of the material.

In still other brick forms it may be desirable to increase the relative porosity to provide greater insulating characteristics of the brick. Thus, it can be seen that careful sizing and handling is important in processing particulate materials for refractory bricks. It is equally important to have the materials in the proper heated condition for pressing or molding into the desired shape since this will affect the finished product.

In accordance with the present invention I have provided an improved materials heating and handling apparatus that will continuously agitate the materials within a storage or materials holding area while heating them to assure uniform heating of the materials and to provide continuous mixing of the particulate so that when it is discharged in the processing sequence the distribution from increment to increment of the materials will be relatively uniform thereby giving greater control in the manufacture of refractory brick.

It is, accordingly, a general object of the present invention to provide an improved materials handling apparatus.

Another object of the present invention resides in the provision of an improved materials handling and heating apparatus.

A further object of the present invention resides in the provision of an improved heating and handling apparatus that will provide for uniform heating of the particulate materials handled therein.

Another object of the apparatus of the present invention resides in the provision of an improved materials heating and handling apparatus having means to continuously cycle the materials in the apparatus both laterally and vertically and having means for adjustment of the flow within the apparatus to compensate for varying flow characteristics of different materials.

An additional object of the present invention resides in the provision of an improved materials handling apparatus that will continuously mix the materials deposited therein in a manner to avoid loss of fines while at the same time applying heat thereto to heat them to a preferred temperature level.

Another object of the present invention resides in the provision of an improved materials handling device for heating particulate materials having materials transport means therein for moving the materials in a cyclical path within the apparatus to provide for uniform mixing and heating of the materials and sequential discharge of increments that have size and temperature properties characteristic of the whole.

A still further object of the present invention resides in the provision of an improved materials handling apparatus adapted to heat and mix materials uniformly therein and to discharge uniformly treated materials continuously or sequentially.

A further object of the present invention resides in the provision of an improved materials heating and handling apparatus that is adapted to conditioning and continuously agitating particulate materials in relatively small batches at a rate of conditioning sufficient to continuously supply apparatus in a later stage of processing, while avoiding large batch losses of materials or unnecessary rehandling of materials in the event of a stoppage in said later stage of processing.

An additional object of the present invention resides in the provision of an improved materials heating and handling apparatus that is efficient in operation, that is easy to use, that does not involve special handling or operating means, that is inexpensive to operate and maintain, that is easy to maintain and that is durable in use.

The novel features which I believe to be characteristic of my invention are set forth with particularity in appended claims. My invention itself, however, together with further objects and advantages thereof, will best be understood by reference to the following description taken in connection with the accompanying drawings, in which:

FIGURE 1 is a side elevation of the apparatus of the present invention schematically illustrating the drive means for the materials handling apparatus, the materials discharge chute and the heating apparatus;

FIGURE 2 is a sectional view of the materials handling and heating apparatus taken along lines 2—2 of FIGURE 1;

FIGURE 3 is a top view of the apparatus of FIGURE 1 showing the mixing apparatus disposed within the materials supporting troughs;

FIGURE 4 is a schematic representation of the materials flow path within each of the troughs of the apparatus as caused, in part, by the outer helical flight, the inner flight and by the padded elements;

FIGURE 5 is a greatly enlarged fragmentary view of a portion of the mixing shaft and blades;

FIGURE 6 is a sectional view of the view of FIGURE 5 taken along the axis of the shaft.

Referring more particularly now to FIGURE 1 of the drawings, the materials handling and heating apparatus is indicated generally at 10. A hopper 12 is supported such that its discharge opening extends (13) over the materials support troughs (discussed in detail hereinbelow). It should be observed that the refractory materials are already mixed and in weighed batches at this stage of the processing. In this manner the materials are charged into the heating and handling apparatus with the desired size distribution.

In one form of the invention the apparatus may hold approximately 1200 pounds of refractory materials, 600 pounds being deposited in each trough of the apparatus with the depth of the material in each trough extending approximately to the level of the shaft, or about 10 inches from the bottom of the trough for the specific apparatus disclosed herein. The bottom of the trough is only slightly larger in arced configuration than the 20 inch diameter of the outer spiral ribbon (discussed in detail hereinbelow).

As seen more clearly in FIGURES 2 and 3, the materials handling apparatus 10 includes two materials support troughs 14 and 16. A shaft is supported in each trough and extends longitudinally thereof as shown at 18 and 20, respectively.

Shaft support members or trunnions 22 and 24 are provided at each end of the troughs 14 and 16 in-line with the shafts 18 and 20. These members rotatably support the shafts externally of said troughs. The terminals of the shafts 18 and 20 extend through the end walls, respectively, of the troughs and into the trunnion supports 22 and 24.

One end of the shaft 18 is provided with a spur gear 26. The common terminal end of the shaft 20 is provided with a spur gear 28. Both spur gears are non-rotatably secured to their respective shafts. A drive motor 30 is supported by the apparatus 10. A drive shaft 32 extending from the drive motor 30 is provided with a pair of spur gears 34 and 36 non-rotatably secured thereto. Each of the gears 34 and 36 is in meshing engagement with one of the spur gears 26 and 28, respectively, to transfer driving motion from the motor 30 to the shafts 18 and 20.

A dividing wall 38 extends between the troughs 14 and 16 to prevent materials interchange between said troughs. The troughs 14 and 16 are otherwise enclosed along the sides by side walls 40 and end walls 42 to define a complete closure except along the tops thereof.

Heating means 44 is provided below the bottom of the troughs 14 and 16. For purposes of illustration the heat supply means employed with the apparatus herein may be an infra-red heater. A burner defined by a series of jets along the bottom of troughs 14 and 16 may be utilized to heat the troughs and thereby heat the materials in the troughs. As indicated in FIGURE 1, fuel is supplied to a common header 46 from a supply line 48 to feed the burner, the fuel being transported from a common fuel source, not shown.

The heating source is separated from the materials in the troughs 14 and 16 so that any disturbance in the combustion zone will not be transmitted to the materials in the bed to cause a disturbance therein and blow the smaller particles about the area and thereby cause materials loss. The lower wall of the troughs may be of stainless steel or other durable composition and structure suitable to withstand abrasive action and cycling temperatures such as occur in use of the apparatus disclosed herein.

A discharge vent 50 is provided to carry the products of combustion from the area beneath the troughs to atmosphere for safe transmittal away from the working area. The fuel from the fuel supply may be mixed prior to introduction to the burners. As seen in FIGURE 3 the fuel-air mixture is provided in the blower 52 which includes an air intake 54. The combustible mixture then is transmitted through the duct 48 to the header 46 for distribution to the burner jets.

One end of each of the troughs 14 and 16, respectively, is provided with a discharge opening 56 which is closed by the door 58. The door is mounted to the apparatus 10 by hinges indicated at 60 in FIGURE 1. A door operator may be provided for opening and closing the discharge means and is defined by the piston-cylinder means 64. The piston includes a piston rod 66 extending from the means 64 and pivotally affixed to one end to the door 58. Thus when the rod 66 is withdrawn into the cylinder the door will be opened, with the arrangement as shown in FIGURE 1. A discharge chute 68 is disposed at the discharge end of the troughs 14 and 16 to receive the materials exiting therefrom. The materials then pass from the chute 68 to the transport means which carries the materials to the brick presses or molding apparatus for forming into the desired refractory shapes.

As noted hereinabove, controlled heating of the refractory materials is important for the production of a refractory shape having the desired physical characteristics whether such heating is during the holding stage, while the presses are otherwise occupied or stopped, or while the material is being warmed from a cold stage to a heated condition ready for use in the presses or molding operation. If the refractory material in particulate form is not properly conditioned during the processing sequence adverse results may be precipitated and early failure or deterioration of the brick may result.

Heating of refractory materials with the apparatus disclosed herein will provide a means for close control during this stage of processing. Further, continuous agitation of the material during the heating stage without violent mixing or disruption of the refractory will result in uniform heating of the materials and discharge of a uniformly heated product mix to the subsequent stage. Uniform heating is essential in the manufacture of brick to assure uniform bonding of the particles and interaction with the bonding agent used in the manufacture of refractory forms. If the binder does not envelope or otherwise co-act uniformly with all of the refractory particles a weak link may be formed in the brick that will result in spalling, cracking, or the like. A uniformly conditioned material is necessary to achieve reproducible, optimum manufacture of refractory forms. If the heating and handling of the material is not carefully controlled unnecessary losses may result in failure of the binder and particulate to co-act properly.

The helical screw and paddle arrangement of the shafts 18 and 20 is illustrated generally in FIGURE 3, the action thereof schematically represented in FIGURE 4 and detailed views of the structure shown in FIGURES 5 and 6. Examples of helical screw arrangements for drying apparatus are illustrated in the patents to E. I. Du Pont (1,304,409), R. J. Staples (2,453,378) and G. C. Baxter (2,887,788). The structures shown in the above patents, however, are typical of helical structures in that the device is intended to move the materials unidirectionally in a continuous path through the apparatus. Theoretically, one pass through the chamber is sufficient to dry and to heat the materials passing therethrough. In conditioning materials for refractory brick it is essential not only to heat the materials in a carefully controlled manner and to mix them for uniform heating without excessive agitation and dust loss but also to provide means for circulation without dead storage. This will assure that the materials may be held sufficiently long to uniformly heat them to the desired level and will assure a controlled continuous mixing of the materials during heating. It also is important to provide an apparatus that will permit continuous or partial discharge of the contents. Also, if only a partial discharge of the material is made, it is important to maintain recirculation and heating of the remainder of the materials in the troughs to keep the refractory particulate in condition for pressing or molding. Another important requirement resides in the provision of an apparatus of the type noted above wherein the flow characteristics may be varied to define optimum flow in cycling during heating and thereby define means for controlled heating of all particles regardless of the material being handled and the flow characteristics of that material.

The apparatus disclosed herein is adapted to perform each of the desired functions above in a manner that will permit uniform heating of the refractory materials while continuously mixing and circulating the same in a continuous path through the apparatus. The structure of the present invention also will permit discharge of materials in a continuous manner or in a partial manner to meet the demands of the presses or molding operation. There is no requirement for continuous discharge of the material as may be required with use of some heating devices presently available. I have found, for example, that with the apparatus of the present invention I can heat 1,200 pounds of particulate for magnesite refractory brick in approximately three minutes. This rate of operation is sufficient to continuously supply sufficient mixed, heated particulate for three brick presses.

The apparatus of the present invention accomplishes these purposes by means of opposed helices and a segmented paddle-like structure mounted on each shaft of the twin-trough materials heater and handling apparatus.

A first helix 72 is disposed about the shaft 18 in a first flight direction extending, as shown in FIGURE 3 viewing the apparatus from the right end, clockwise in direction from the driven end of the shaft to the left end portion of the shaft disposed within the trough 14. The first helix 72 is affixed to the shaft by a plurality of support rods 74 rigidly affixed to and extending radially from the shaft 18 at spaced intervals therealong. The helix 72 may be bolted, welded, or otherwise affixed to the support rods 74. The helix 72 extends continuously from the outer periphery of the shaft 18 radially outwardly to a first base cylinder 76 spaced from the outer periphery of said shaft a predetermined distance.

A second helix 78, also affixed to the shaft 18 by the support rods 74, is disposed about the shaft 18 in a second flight direction extending (when viewed from the same position as noted above in connection with discussion of the first helix) counter-clockwise in direction defining a path from the driven end to the free end of the shaft 18. The second helix extends in a solid path radially of the shaft 18 from the first base cylinder 76 outwardly terminating in a second base cylinder spaced a predetermined greater distance from the shaft 18 than the base cylinder 76.

A plurality of segmented plate elements 82 are affixed to the shaft 18 at spaced intervals therealong. Each of the elements 82 may define a solid segment of a continuous base helix extending in flight direction along the shaft 18 in the same direction as the first helix 72. As illustrated, each of the plate elements 82 extends radially from the periphery of the shaft 18 outwardly to approximately the base cylinder 80 or approximately to the outer diameter of the second helix 78. However, the plate elements need not extend to the outer diameter of the second helix but should extend at least partway into the region swept by the second helix. The plate elements could be made radially adjustable as well as rotatably adjustable to vary their effect on the material flow in the trough. One of the important aspects of the present invention resides in the provision of adjustale elements 82. As shown in FIGURE 5, each of the elements 82 is affixed to the shaft 18 with a bolt 82''. The angular position of the element 82 on the shaft may be adjusted as desired to vary the flow directing function of the entire materials conveying apparatus. Thus, the moveable blade elements 82 define vernier flow adjustment means for varying the flow of materials in either direction in the troughs. In the specific illustration set forth herein, the elements 82 are positioned to move materials generally in the same direction laterally as the helix 72, while at the same time scooping the material for vertical or layer interchange to define means for more uniform heating of the particulate.

The helical and blade assembly of the shaft 20 is of the same structure as that of the shaft 18 and common parts thereof are identified in FIGURE 3 with the same numbers as those of shaft 18 with a prime (') added thereto. With this structure it can be seen that the common drive means 30 will operate both shafts 18 and 20 and related structures to cause materials flow within the troughs 14 and 16 to define the same paths, respectively.

The materials flow path in the troughs 14 and 16, respectively, is schematically illustrated in FIGURE 4. It shoud be observed that the troughs 14 and 16 preferably will have refractory materials deposited only in the lower portion thereof in use and thus the helices, shafts, and the like, will not be buried under the materials but rather will be operating such that substantially the lower half of the helices will be engaging materials at any given time.

As shown in FIGURE 4, the flow of materials in the troughs 14 and 16 with rotation of the shaft in a clockwise direction will be such that the materials engaged by the second helix 78 will be moved along by a surface that acts, in effect, like an inclined plane continually urging the materials from the right to the left in the troughs (as viewed in FIGURES 3 and 4). Thus, the helix 72 having a flight direction opposed to that of the helix 78 will move the materials that it engages in direction from left to right. However, the helix 72 is significantly smaller in diameter than helix 78 and the effective surface area engaging the materials is less than that of helix 78. Accordingly, more materials wil be engaged by the helix 78 and moved toward the left than moved toward the right by the helix 72. It can readily be seen that eventually the materials would accumulate at the left end of the troughs and uniform heating and distribution would be adversely effected. To compensate for this characteristic I include the segmented place elements 82 on the shafts 18 and 20. The plate elements 82, as noted above, in one position of each will define solid segmented of a continuous base helix having the same spiral direction on the shaft 18 and 20 as the helix 72. Accordingly, whatever materials the elements 82 engage will be moved along the troughs 14 and 16 in the same lateral direction as the materials engaged by the helix 72. The size, number and spacing of the plate elements 82 is provided such that said elements will compensate for the materials engaging surface differential and diameter differential of the helices 72 and 78 and materials movement equilibrium may be achieved and maintained at all times in the troughs 14 and 16 during movement of the shafts 18 and 20 with layer intermixing for uniform materials heating.

With the apparatus of the present invention a batch-type heater and handling apparatus is provided without the dormant materials conditioning characteristic of conventional batch-type devices and without the requirement of continuous materials flow through the device as seen in other devices presently in use. With a conventional continuous materials heating device the materials discharged from the heater must be stored, in heating condition, prior to feeding to the bonding mixture stage and molding or pressing stage. Thus, with a continuous heater even after the materials are heated to the desired level additional heat must be applied to materials which may be in a dormant state and while the materials are being stored ready for use. With a batch-type heater, such as disclosed herein, only so much materials as the presses are ready and able to use will be processed.

The apparatus of the present invention avoids the limitations of a process including a continuous materials heater by heating the refractory materials in relatively small batches. In one embodiment of the invention, for example, an apparatus may be provided for heating approximately 1200 pounds of material, 600 pounds in each of the two troughs. The 600 pound segments are recombined after heating and are charged to a mixer where the bonding agent is rapidly mixed with the material. The entire batch then is fed to an agitator and to the presses for forming into refractory shapes.

I have found that with the apparatus disclosed herein a 1200 pound batch of refractory material, for example magnesite, can be heated from ambient temperatures to approximately 300° F. in about 3 minutes.

When the materials are first charged to the heater, of course, they will be a relatively small total volume until the heater is fully charged as noted above. As the material is charged it drops to the bottom of the troughs and is carried along by the larger diameter ribbon helix 78 to be spread out in a layer approximately 2 inches in thickness as defined by the radial dimension of the ribbon helix 78. Until this uniform layer is built up, the smaller diameter helix 72 will not engage material and the flow will be from right to left as seen in FIGURE 3. The segments or plate elements 82 will, of course, engage some materials during each cycle of rotation of the shaft and scoop it out of the initial layer being built up to move it in direction opposite to the flow brought about by engagement of the helix or blade 78 with said materials. The plate elements 82, however, will not return sufficient material to define equilibrium flow conditions within the troughs 14 and 16.

Charging of additional materials will bring the materials depth in excess of about 2 inches, or the radial thickness of the ribbon helix, and the inner spiral or helix 72 then will engage the materials and bring about a continuous equilibrium counter-flow of materials in the troughs.

Thus, the flow at any time in the troughs is multi-directional. That is, it is moving both laterally and vertically. The ribbon helix 78 will move materials from right to left as seen in FIGURE 3. It can readily be seen that as the helix 78 scoops materials along a depression will be created in the area of passage of the helix blade. The materials immediately above the layer engaged by the helix 78 will drop down toward the bottom of the trough to fill the void—these materials having been moving flow direction by engagement with the inner helix 72. The inner helix 72 will engage materials above the layer of the helix 78 and will move these materials in reverse direction or from left to right in FIGURE 3. The plate elements 82 will intermittently scoop out a portion of the materials from the trough including materials being moved along by the helix 78 and drop them on the surface of the materials so that the warmer materials from the bottom are continuously being brought to the surface and another means provided to assure rapid uniform heating of the materials in the trough.

The materials flow in the troughs then will be in one lateral direction by action of the helix 78 and in the opposite lateral direction by movement of the helix 72. The plate elements 82 will move materials opposite in direction to movement by the helix 78, when the plates are positioned as shown in FIGURE 3, and also vertically by scooping material from the bottom of the trough and dropping it upon the surface of the material being heated in the trough. There will be a further vertical exchange of material in the trough by dropping of material into the voids created during passage of the helices along their paths of movement.

The lateral and vertical cycling of the materials in the trough defines means for rapid, efficient, uniform heating of the materials. At the same time the relatively gentle motion of materials during cycling will not cause significant loss of fines. Thus, efficiency of the process as well as positive conditioning control is achieved. Another very important aspect resides in the provision of means for adjustment of the flow of materials within the troughs by the 360° adjustment available with the plate elements 82.

By means of the unique materials handling and heating device disclosed herein I provide for processing without interruption as experienced with some prior art devices. Further, materials may be circulated in the heater without significant dust loss while heating to the desired temperature level. Another advantage of my invention resides in the ability of the apparatus to process refractory materials, for example, continuously or intermittently, depending upon the demands of the pressing and molding operation succeeding the mixing and heating steps. To this extent a refractory manufacturing process may be employed with the heating apparatus of the present invention, that is totally responsive to the demands of the molding operation and one that will maintain refractory materials in a state of readiness while at the same time permitting incremental discharge of materials from the device. Still another significant aspect of the apparatus of the present invention resides in the provision of means for adjustment of the flow of materials whereby any particulate materials with any flow characteristic may be accommodated.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. An apparatus for particulate materials comprising: a trough to support said materials therein; means to apply heat to said trough and thereby to the materials therein; a shaft rotatably supported in said trough; a first blade helically disposed about and affixed to said shaft in a first flight direction, said first blade terminating in a first base cylinder; a second blade helically disposed about and affixed to said shaft in flight direction opposed to said first flight direction, said second blade extending radially from said first base cylinder and terminating in a second base cylinder; a plurality of plate elements affixed to said shaft defining helical segments at intervals therealong, and means for adjusting the angle of said plate elements, the flight direction of said plate elements being substantially the same as the flight direction of said first blade whereby the materials in said trough will be circulated in one direction by said second blade and in another direction by the combined action of the first blade and the plate elements, the volume of materials movement in each direction being substantially the same and flow being in equilibrium in said troughs to provide for continuous movement of the particulate materials within the heating chamber to uniformly heat the particulate materials and to provide for discharge from the heating troughs in a continuous manner or in incremental portions.

2. An apparatus for uniformly heating and handling particulate materials comprising: a trough to support said particulate materials; means to heat said trough and thereby the materials therein; shaft support means on said trough; a shaft rotatably supported by said shaft support means; a first blade helically disposed about and affixed to said shaft in a first flight direction and terminating outwardly in a first base cylinder; a second blade helically disposed about and affixed to said shaft in flight direction opposed to said first flight direction, said second blade extending radially from said shaft beginning from said first base cylinder and terminating outwardly in a second base cylinder; a plurality of plate elements affixed to said shaft defining helical segments at spaced intervals therealong and in one position of each defining a solid segment of a helix along said shaft, and means for adjusting the angle of said plate elements, the flight direction of said plate elements being substantially the same as the flight direction of said first blade whereby the particulate materials in said trough will be circulated in one direction by said second blade and in another direction by the combined action of the first blade and the plate elements, the volume of materials movement in each direction being substantially the same to provide for continuous equilibrium movement of particulate materials within the heating chamber to provide uniform heating of said materials and to provide for discharge of materials from the heating troughs in a continuous manner or in incremental portions.

3. An apparatus for uniformly heating and handling particulate materials comprising: a materials flow trough to support said particulate materials; means to heat said materials flow trough and thereby the materials therein; shaft support means on said trough; a shaft rotatably supported by said shaft support means; a plurality of support elements mounted on said shaft and extending radially therefrom at axially spaced intervals therealong; a first blade helically disposed about said shaft in a first flight direction and affixed thereto by said support elements, said first blade defining a solid blade extension of said shaft terminating in a first base cylinder radially spaced from the outer circumference of said shaft; a second blade helically disposed about said shaft in flight direction opposed to said first flight direction and affixed thereto by said support element, said second blade extending radially from said shaft beginning from said first base cylinder and terminating outwardly in a second base cylinder; a plurality of plate elements affixed to said shaft at spaced intervals therealong, said plate elements defining helical segments along said shaft, and means for adjusting the angle of said plate elements, the flight direction of said plate elements being in one selective position of each the same as the flight direction of said first blade whereby the particulate materials in said trough will be circulated in one direction by said second blade and in another direction by the combined action of the first blade and the plate elements, the volume of materials movement in each direction being substantially the same to provide for continuous equilibrium movement of the materials within the heating chamber to provide uniform heating of said materials and for discharge of materials from the heating trough, selectively, in a continuous manner or in incremental portions.

4. An apparatus for heating and handling particulate materials comprising: a materials trough; means to heat said trough and thereby the materials therein; a shaft rotatably mounted within said trough; a first blade helically disposed about and affixed to said shaft in a first flight direction, said first blade defining a radially solid blade extension of said shaft terminating in a first base cylinder uniformly radially spaced from the outer periphery of said shaft; a second blade helically disposed about and affixed to said shaft in flight direction opposed to said first flight direction, said second blade extending radially from said shaft beginning from said first base cylinder and terminating outwardly in a second base cylinder thereby defining a blade wholly displaced from the surface of said shaft; a plurality of plate elements affixed to said shaft at spaced intervals therealong defining helical segments along said shaft, and means permitting adjustment of the flight angle of said plate elements, the flight direction of said plate elements being substantially the same as the flight direction of said first blade, said first blade and plate elements having an effective surface area in materials contact substantially equal to the effective surface area of the second blade whereby particulate materials in said trough will be circulated in one direction by said second blade and in the opposite direction by the combined action of the first blade and the plate elements, the volume of materials movement in each direction being substantially the same to provide for continuous movement within the heating chamber, to provide uniform heating of the materials and discharge from the heating troughs, selectively, either in a continuous manner or in incremental materials portions.

5. The apparatus as claimed in claim 4 wherein each of said plate elements extends radially outwardly from said shaft to said second base cylinder.

6. Apparatus for conditioning particulate materials comprising a trough for receiving said materials, means for heating said trough and contained materials, a shaft rotatably mounted within said trough, an inner helical blade on said shaft extending substantially the full length thereof adapted to move material in one axial direction, an outer helical blade secured to said shaft axially coextensive with said inner blade adapted to move material in the opposite direction, a plurality of spaced plate elements on said shaft defining helical segments, said plate elements extending radially outwardly from said shaft into the region swept by said outer helical blade on rotation of said shaft, the flight direction of said plate elements being substantially the same as the flight direction of said inner blade whereby said plate elements and inner blade cooperate to displace material in one direction equal in volume to that displaced in the opposite direction by said outer blade, thereby maintaining a level bed of material in said trough.

7. The apparatus as claimed in claim 6 including means for adjusting the flight angle of said plate elements.

8. The invention as claimed in claim 6 including means for selectively discharging material from said trough at the trough end toward which said outer blade is adapted to move material.

References Cited

UNITED STATES PATENTS

| 504,099 | 8/1893 | Wiesebrock | 34—179 |
|---------|--------|------------|--------|
| 539,055 | 5/1895 | Holthavs | 34—179 |
| 1,030,250 | 6/1912 | Blystone | 259—178 X |
| 1,052,079 | 2/1913 | Meier | 259—178 |
| 2,235,311 | 3/1941 | Bullard | 263—25 |

FREDERICK L. MATTESON, Jr., *Primary Examiner.*

D. A. TAMBURRO, *Assistant Examiner.*